United States Patent
Zhang et al.

(10) Patent No.: US 10,146,743 B2
(45) Date of Patent: *Dec. 4, 2018

(54) SYSTEMS AND METHODS FOR OPTIMIZING CONTENT LAYOUT USING BEHAVIOR METRICS

(71) Applicant: Google Inc., Mountain View, CA (US)

(72) Inventors: Guannan Zhang, Beijing (CH); Zhenguo Ou, Beijing (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/261,169

(22) Filed: Sep. 9, 2016

(65) Prior Publication Data

US 2016/0378719 A1 Dec. 29, 2016

Related U.S. Application Data

(63) Continuation of application No. 14/308,955, filed on Jun. 19, 2014, now Pat. No. 9,465,887, which is a (Continued)

(51) Int. Cl.
*G06F 17/00* (2006.01)
*G06F 17/21* (2006.01)
(Continued)

(52) U.S. Cl.
CPC .......... *G06F 17/211* (2013.01); *G06F 3/0481* (2013.01); *G06F 3/04842* (2013.01);
(Continued)

(58) Field of Classification Search
None
See application file for complete search history.

(56) References Cited

U.S. PATENT DOCUMENTS

| 8,225,195 B1 | 7/2012 | Bryar et al. |
| 8,538,989 B1 * | 9/2013 | Datar ................ G06F 17/30616 707/780 |

(Continued)

FOREIGN PATENT DOCUMENTS

| CN | 102346899 | 2/2012 |
| EP | 1 632 874 A2 | 8/2006 |

(Continued)

OTHER PUBLICATIONS

International Search Report & Written Opinion on PCT/CN2014/074648 dated Dec. 30, 2014.
(Continued)

*Primary Examiner* — Howard Cortes
(74) *Attorney, Agent, or Firm* — Foley and Lardner LLP

(57) ABSTRACT

Systems and methods for optimizing content layout using behavior metrics are provided. Behavioral data is collected for a content item presented on a client device. The behavioral data indicates various locations within a display area of the content item at which a user action (e.g., clicking) occurs. The behavioral data is used to assign weights to various components of a layout scheme for the content item. A user action that occurs within an area of the content item associated with a particular component of the layout scheme contributes to the weight of the corresponding component. The weights associated with each component of the layout scheme are used to optimize the layout for the content item. Components with greater assigned weights are highlighted or emphasized. The display sizes of components in the optimized layout scheme may correspond to the weights associated with the components.

17 Claims, 6 Drawing Sheets

Related U.S. Application Data continuation of application No. PCT/CN2014/074648, filed on Apr. 2, 2014.

(51) Int. Cl.
| | |
|---|---|
| *G06F 9/451* | (2018.01) |
| *G06F 3/0484* | (2013.01) |
| *G06F 17/30* | (2006.01) |
| *G06Q 30/02* | (2012.01) |
| *G06F 3/0481* | (2013.01) |

(52) U.S. Cl.
CPC ............ *G06F 9/451* (2018.02); *G06F 17/212* (2013.01); *G06F 17/30905* (2013.01); *G06Q 30/02* (2013.01); *G06Q 30/0277* (2013.01)

(56) References Cited

U.S. PATENT DOCUMENTS

| | | | |
|---|---|---|---|
| 9,037,975 B1 | 5/2015 | Taylor et al. | |
| 2007/0022216 A1* | 1/2007 | Benari | G06T 3/40 709/247 |
| 2007/0124202 A1 | 5/2007 | Simons | |
| 2008/0028294 A1 | 1/2008 | Sell et al. | |
| 2008/0046562 A1* | 2/2008 | Butler | G06F 17/3089 709/224 |
| 2008/0228910 A1 | 9/2008 | Petri | |
| 2009/0172562 A1 | 7/2009 | Lai | |
| 2010/0180222 A1 | 7/2010 | Otsuka et al. | |
| 2010/0293185 A1 | 11/2010 | Rosado et al. | |
| 2011/0131479 A1* | 6/2011 | Padgett | G06F 3/04895 715/223 |
| 2012/0311465 A1* | 12/2012 | Nealer | H04L 29/06 715/760 |
| 2013/0031470 A1 | 1/2013 | Daly et al. | |
| 2013/0073945 A1* | 3/2013 | Bingell | G06F 17/30905 715/234 |
| 2013/0080910 A1 | 3/2013 | Bingell et al. | |
| 2013/0091417 A1* | 4/2013 | Cordasco | G06F 17/30902 715/234 |
| 2013/0212487 A1* | 8/2013 | Cote | G06F 9/451 715/745 |
| 2014/0136947 A1* | 5/2014 | Naick | G06F 17/30905 715/234 |
| 2014/0143652 A1* | 5/2014 | DeLoach | G06F 17/212 715/234 |
| 2014/0245128 A9* | 8/2014 | Brant | G06F 17/248 715/234 |
| 2014/0280555 A1* | 9/2014 | Tapia | G06Q 50/01 709/204 |
| 2015/0082181 A1 | 3/2015 | Ames et al. | |
| 2015/0169521 A1* | 6/2015 | Leventhal | G06F 17/227 715/234 |
| 2015/0177945 A1* | 6/2015 | Sengupta | G06F 3/0488 715/744 |
| 2015/0268838 A1* | 9/2015 | Wang | G06F 3/04847 715/763 |

FOREIGN PATENT DOCUMENTS

| | | |
|---|---|---|
| JP | 2003-248700 | 9/2003 |
| JP | 2004-088454 A | 3/2004 |
| JP | 2005-050355 A | 2/2005 |
| JP | 2009-053219 A | 3/2009 |
| JP | 2010-160763 A | 7/2010 |
| JP | 2013-016099 A | 1/2013 |
| JP | 2013-196415 A | 9/2013 |

OTHER PUBLICATIONS

Notice of Allowance on U.S. Appl. No. 14/308,955 dated Jul. 6, 2016.
International Preliminary Report on Patentability on PCT/CN2014/074648 dated Oct. 13, 2016.
Notice of Reasons for Rejection for JP Application No. 2017-055778 dated Jan. 5, 2018 (with English translation, 10 pages).
Supplementary European Search Report for EP 14887713.7 dated Dec. 22, 2017(8 pages).

* cited by examiner x = click event
o = hover event

SYSTEMS AND METHODS FOR OPTIMIZING CONTENT LAYOUT USING BEHAVIOR METRICS

CROSS-REFERENCE TO RELATED PATENT APPLICATIONS

This application is a Continuation of and claims priority to U.S. Ser. No. 14/308,955, filed Jun. 19, 2014, incorporated herein by reference in its entirety, which is a Continuation of PCT Application No. PCT/CN2014/074648, filed Apr. 2, 2014 and titled "SYSTEMS AND METHODS FOR OPTIMIZING CONTENT LAYOUT USING BEHAVIOR METRICS." The contents of which are incorporated herein by reference in its entirety.

BACKGROUND

The Internet provides access to a wide variety of content. Publishers of webpages and other types of first-party content often monetize their content by allowing sponsored third-party content (e.g., advertisements) to be integrated therewith. A programmatic Internet advertising system can be used to automate the selection and integration of third-party content with the first-party content. Third-party content providers typically create content items for presentation on a client device. It can be difficult and challenging for third-party content providers to create effective and attractive content items.

SUMMARY

One implementations of the present disclosure is a method for optimizing a layout of content. The method includes collecting behavioral data for a content item presented on a client device. The content item may be a third-party content item or a non-third-party content item. The behavioral data indicates a location within a display area of the content item at which a user action occurs. The method further includes assigning a weight to each of a plurality of components of a layout scheme for the content item based on the behavioral data collected for the content item, identifying a component of the layout scheme that has a greatest assigned weight, and increasing a display size of the component of the layout scheme that has the greatest assigned weight relative to a display size of a component of the layout scheme that has a lesser assigned weight.

In some implementations, the method further includes identifying a component of the layout scheme that has a second greatest assigned weight, calculating a weight ratio between the component that has the greatest assigned weight and the component that has the second greatest assigned weight, and increasing a display size of the component that has the second greatest assigned weight until a display size ratio between the component that has the greatest assigned weight and the component that has the second greatest assigned weight matches the calculated weight ratio.

In some implementations, the method further includes prior to increasing the display size of the component that has the greatest assigned weight, decreasing a display size of each of the plurality of components of the layout scheme to a minimum display size. In some implementations, the method further includes after increasing the display size of the component that has the greatest assigned weight, uniformly increasing the display size of each of the plurality of components of the layout scheme that have not yet been increased in display size until any usable space in the content item is filled.

In some implementations, the user action at the location within the display area of the content item includes at least one of clicking on the content item at the location or hovering over the content item at the location.

In some implementations, the behavioral data for the content item includes an indication of a location at which a user action occurs for each of a plurality of user actions that occur within the display area of the content item.

In some implementations, collecting behavioral data for the content item includes delivering the content item to the client device, monitoring user actions performed via the client device for user actions that occur within the display area of the content item, and, in response to a determination that a user action occurs within the display area of the content item, identifying the location of the content item at which the user action occurs.

In some implementations, the method further includes accessing an initial layout scheme for the content item. The initial layout scheme may indicate, for each of the plurality of components of the layout scheme, an area of the content item associated therewith. The method may further include identifying an area of the content item within which the user action occurs.

In some implementations, assigning a weight to a component of the layout scheme includes using an initial layout scheme for the content item to identify a component of the initial layout scheme associated with an area of the content item within which the user action occurs and incrementing a weight for the identified component of the layout scheme.

In some implementations, increasing the display size of the of the component that has the greatest assigned weight relative to a display size of a component that has a lesser assigned weight includes at least one of increasing the display size of the component that has the greatest assigned weight or decreasing the display size of the component that has the lesser assigned weight.

In some implementations, increasing the display size of the of the component that has the greatest assigned weight relative to a display size of a component that has a lesser assigned weight includes, prior to increasing the display size of the component that has the greatest assigned weight, decreasing a display size of each of a plurality of components of the layout scheme to a minimum display size. The display size of the component that has the greatest assigned weight may be increased from the minimum display size to a maximum display size.

In some implementations, the method further includes determining, for each of the plurality of components of the layout scheme, whether the component is an image component or a text component. The minimum display size for an image component may be a threshold display area. The minimum display size for a text component may be a minimum threshold font size.

In some implementations, the method further includes determining whether the component that has the greatest assigned weight is an image component or a text component. If the component that has the greatest assigned weight is an image component, the maximum display size may be a display size of a raw image used to generate the image component. If the component that has the greatest assigned weight is a text component, the maximum display size may be a maximum threshold font size.

Another implementation of the present disclosure is a system for optimizing a layout of content. The system includes a processing system configured to collect behavioral data for a content item presented on a client device. The content item may be a third-party content item or a non-third-party content item. The behavioral data indicates a location within a display area of the content item at which a user action occurs. The processing system is configured to assign a weight to each of a plurality of components of a layout scheme for the content item based on the behavioral data collected for the content item, to identify a component of the layout scheme that has a greatest assigned weight, and to increase a display size of the component of the layout scheme that has the greatest assigned weight relative to a display size of a component of the layout scheme that has a lesser assigned weight.

In some implementations, the processing system is configured to generate a behavioral data collection object and to deliver the behavioral data collection object to the client device. The behavioral data collection object may cause the client device to monitor user actions performed at the client device for user actions that occur within a display area of the content item and to report user actions that occur within the display area of the content item back to the processing system.

In some implementations, the processing system is configured to integrate the behavioral data collection object with the content item and to deliver the behavioral data collection object to the client device in conjunction with the content item.

In some implementations, the user action at the location within the display area of the content item includes at least one of clicking on the content item at the location or hovering over the content item at the location.

In some implementations, the processing system is configured to identify a component of the layout scheme that has a second greatest assigned weight, to calculate a weight ratio between the component that has the greatest assigned weight and the component that has the second greatest assigned weight, and to increase a display size of the component that has the second greatest assigned weight until a display size ratio between the component that has the greatest assigned weight and the component that has the second greatest assigned weight matches the calculated weight ratio.

In some implementations, the processing system is configured to decrease a display size of each of the plurality of components of the layout scheme to a minimum display size prior to increasing the display size of the component that has the greatest assigned weight. In some implementations, the processing system is configured to increase the display size of each of the plurality of components of the layout scheme that have not yet been increased in display size until any usable space in the content item is filled after increasing the display size of the component that has the greatest assigned weight.

Another implementation of the present disclosure is a computer-readable storage medium having instructions stored therein. The instructions are executable by one or more processors to cause the one or more processors to perform operations including collecting behavioral data for a content item presented on a client device. The behavioral data indicates a location within a display area of the content item at which a user action occurs. The operations include assigning a weight to each of a plurality of components of a layout scheme for the content item based on the behavioral data collected for the content item, identifying a component of the layout scheme that has a greatest assigned weight, and increasing a display size of the component of the layout scheme that has the greatest assigned weight relative to a display size of a component of the layout scheme that has a lesser assigned weight.

In some implementations, the operations further include identifying a component of the layout scheme that has a second greatest assigned weight, calculating a weight ratio between the component that has the greatest assigned weight and the component that has the second greatest assigned weight, and increasing a display size of the component that has the second greatest assigned weight until a display size ratio between the component that has the greatest assigned weight and the component that has the second greatest assigned weight matches the calculated weight ratio.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
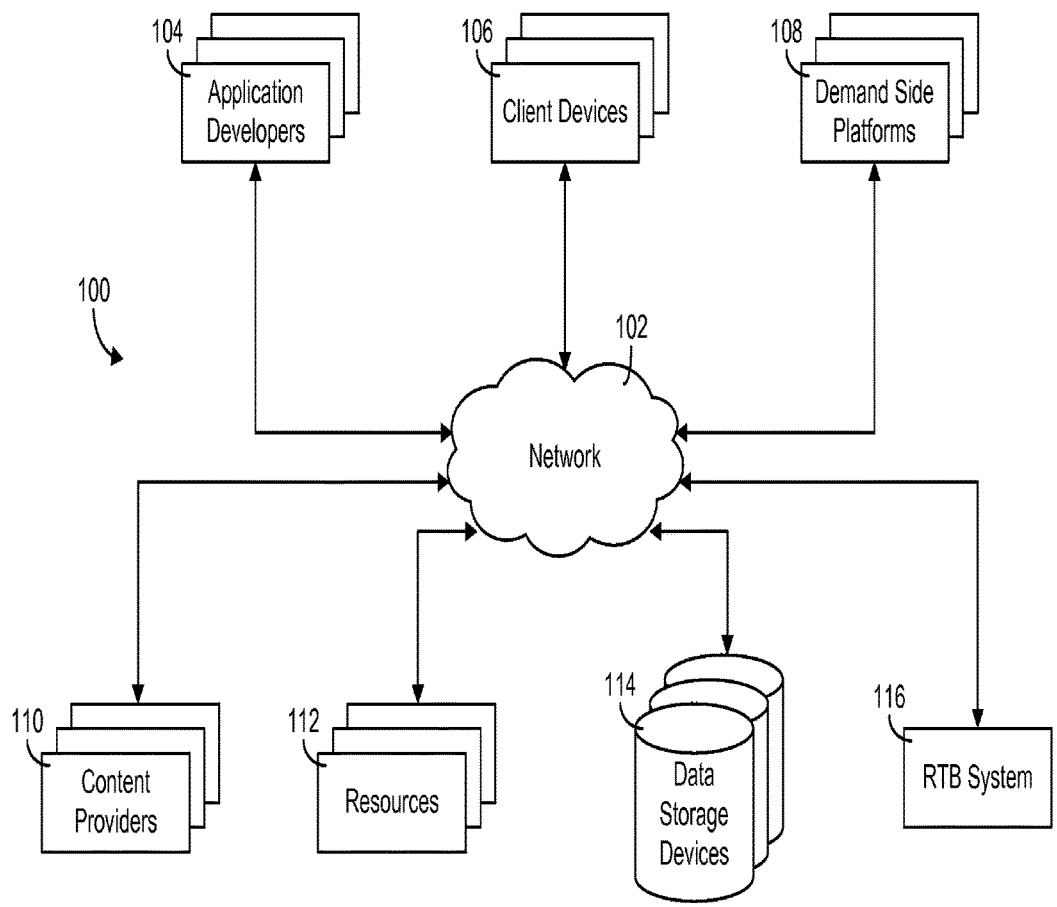
FIG. 1 is block diagram of a computing system including a network, resources, content providers, client devices, data storage devices, and a content server, according to a described implementation.

Referring generally to the FIGURES, systems and methods for optimizing content layout using behavior metrics are shown, according to a described implementation. The layout of a content item may be important for conveying information effectively to viewers. Layout options such as font size, logo size, and image size may have a significant impact on both the ability of the content to convey information and the performance of the content (e.g., conversions, clicks, etc.). Content providers may not have the experience or knowledge required to optimize the layout of their content items. Even for experienced content providers, it can be difficult to determine which components of a content item should be optimized to improve content performance.

The systems and methods described herein may be used to optimize the layout of a content item presented on a client device. The content item may be a third-party content item (e.g., an advertisement) or a non-third-party content item. Content items can be optimized by emphasizing or highlighting the most important components thereof (e.g., making images or logos bigger, increasing font size, bolding text, etc.). The systems and methods of the present disclosure can be used to identify which components of a content item are most important and to optimize the content item by emphasizing the identified components.

Behavioral data can be collected for the content item when the content item is presented on a client device. The behavioral data may describe an action performed by a user of the client device with respect to the content item. The behavioral data may indicate a location (e.g., x and y coordinates) within a display area of the content item at which a user action occurs (e.g., a location that the content item is clicked, a location that a mouse cursor hovers over the content item, etc.). Computer code and/or script can be delivered to the client device (e.g., by a content server) along with the content item to cause the client device to collect and report the behavioral data. The behavioral data can be used to identify the components of the content item that receive user actions most frequently.

A layout scheme for the content item may be used to determine the areas of the content item that correspond to each component (e.g., images, text, logos, etc.) of the layout scheme. The layout scheme for the content item may define an area of the content item occupied by each component of the layout scheme. The layout scheme for a content item can be used to map the location of a user action within the display area of the content item to a particular component of the layout scheme.

The systems and methods described herein may be used to assign weights to various components of a layout scheme for a content item based on the behavioral data collected for the content item. A user action that occurs within an area of the content item associated with a particular component of the layout scheme may add to the weight of the corresponding component. Components of the layout scheme that are clicked more frequently may be assigned a greater weight than components that are clicked less frequently.

The weights associated with each component of the layout scheme may be used to optimize the layout for the content item. Components with greater assigned weights may be highlighted or emphasized (e.g., increased in display size, bolded, etc.). In various implementations, components with lesser assigned weights are decreased in display size (e.g., to make room for the greater weighted components) or left unmodified. The display sizes of components in the adjusted layout scheme may correspond to the weights associated with the components.

Referring now to FIG. 1, a block diagram of a computing system 100 is shown, according to a described implementation. In brief overview, computing system 100 is shown to include a network 102, resources 104, content providers 106, client devices 108, data storage devices 110, and a content server 112. It should be noted that although the various components of computing system 100 are shown and described separately with reference to FIG. 1, in some implementations, one or more components of computing system 100 may be combined into a single component. Data storage devices 110 may be a component of content server 112, resources 104, content providers 106, and/or client devices 108. In some implementations, the functions of resources 104 and content providers 106 may be performed by a single entity.

Computing system 100 may facilitate communication between resources 104, content providers 106, and client devices 108. Client devices 108 may request and receive first-party resource content (e.g., web pages, documents, etc.) from resources 104 via network 102. In some implementations, resources 104 include content slots for presenting content items from content providers 106. When resource content is viewed by client devices 108, content items from content providers 106 may be delivered and presented in the content slots of resources 104.

Computing system 100 may also facilitate communication between resources 104, content providers 106, client devices 108, and content server 112. Content server 112 may receive a notification of an available impression from client devices 108 when resource content from resources 104 is loaded and/or viewed by client devices 108. Content server 112 may select one or more third-party content items (e.g., advertisements provided by content providers 106) and deliver the selected content items to client devices 108. In some implementations, content server 112 generates a behavioral data collection object (e.g., computer-readable instructions) and delivers the behavioral data collection object to client devices 108. The behavioral data collection object may cause client devices 108 to monitor and/or report a location of a user action within the display area of the content item. In other implementations, the behavioral data collection object may be included in the content of resources 104 (e.g., by a webpage publisher) and delivered to client devices 108 along with first-party content from resources 104.

Still referring to FIG. 1, and in greater detail, computing system 100 is shown to include a network 102. Network 102 may be a local area network (LAN), a wide area network (WAN), a cellular network, a satellite network, a radio network, the Internet, or any other type of data network or combination thereof. Network 102 may include any number of computing devices (e.g., computers, servers, routers, network switches, etc.) configured to transmit, receive, or relay data. Network 102 may further include any number of hardwired and/or wireless connections. Client devices 108 may communicate wirelessly (e.g., via WiFi, cellular, radio, etc.) with a transceiver that is hardwired (e.g., via a fiber optic cable, a CAT5 cable, etc.) to a computing device of network 102.

Still referring to FIG. 1, computing system 100 is shown to include resources 104. Resources 104 may include any type of information or data structure that can be provided over network 102. In some implementations, resources 104 may be identified by a resource address associated with each resource (e.g., a uniform resource locator (URL)). Resources 104 may include websites, webpages (e.g., HTML webpages, PHP webpages, etc.), word processing documents, portable document format (PDF) documents, images, video, programming elements, interactive content, streaming video/audio sources, or other types of electronic information.

Resources 104 may include first-party content provided by various publishers. In some implementations, a publisher may operate a website which includes a plurality of webpages (e.g., a first webpage, a second webpage, etc.). The website and the webpages may be part of resources 104. Publishers may interact with content server 112 (e.g., via a management interface) to adjust the configuration settings for various webpages of resources 104.

Resources 104 may include a variety of content elements. Content elements may include, textual content elements (e.g., text boxes, paragraph text, text snippets, etc.), image content elements (e.g., pictures, graphics, etc.), video content elements (e.g., streaming video, moving graphics, etc.), hyperlink content elements (e.g., links to webpages, links to other resources, etc.), or any other type of content element that is rendered when resources 104 are viewed and/or loaded by client devices 108. Content elements can have various sizes, positions, orientations, or other attributes defining how content elements are displayed on resources 104 (e.g., a transparency attribute, a position attribute, a size attribute, etc.).

In some implementations, resources 104 include content slots for presenting content items. Resources 104 may include one or more inline frame elements (e.g., HTML "iframe" elements, <iframe> . . . </iframe>) for presenting third-party content items from content providers 106. An inline frame can be a target frame for links defined by other elements and can be selected by user agents (e.g., client devices 108, a web browser running on client devices 108, etc.) as the focus for printing, viewing its source, or other forms of user interaction. The content slots may cause client devices 108 to request third-party content items in response to viewing first-party resource content from resources 104.

Various elements of resources 104 may be included in the original content of resources 104 or added to resources 104. Some elements of resources 104 may be part of the source code of resources 104. Other elements of resources 104 may be added by content providers 106, content server 112, and/or client devices 108. Added content may include third-party content items, computer-readable instructions, configuration information, tag firing rules, or other content which can be inserted into resources 104. In various implementations, the additional content may be inserted into an existing frame of resources 104 or a new element may be created for the additional content. Client devices 108 may create and/or insert a new <ins> element in the document object model (DOM) of resources 104.

Resources 104 may include elements (e.g., tags, script elements, etc.) which have embedded information (e.g., meta-information embedded in hyperlinks) and/or embedded instructions. Embedded instructions may include computer-readable instructions (e.g., software code, JavaScript®, ECMAScript®, etc.) which are executed by client devices 108 (e.g., by a web browser running on client devices 108). Computer-readable instructions may be included in the original (i.e., source) content of resources 104 or added to resources 104 when rendered by client devices 108.

In some implementations, resources 104 include a block of computer-readable code or script which causes client devices 108 to collect and/or report behavioral data. Resources 104 may include a behavioral data collection object which causes user devices to collect and/or report a location (e.g., x and y coordinates) at which a user action occurs (e.g., clicking at a particular location, hovering over a particular location, etc.). The behavioral data collection object may be part of the source content of resources 104 or inserted into resources 104 (e.g., by content server 112). Content server 112 may generate and deliver the behavioral data collection object to client devices 108 along with a third-party content item. Client devices 108 may insert the behavioral data collection object into the content of resources 104.

Still referring to FIG. 1, computing system 100 is shown to include content providers 106. Content providers 106 may include one or more electronic devices representing advertisers, business owners, advertising agencies, or other entities capable of generating third-party content to be presented along with first-party content from resources 104. In some implementations, content providers 106 produce third-party content items (e.g., an ad creative) for presentation to client devices 108. In other implementations, content providers 106 may submit a request to have third-party content items automatically generated. The third-party content items may be stored in one or more data storage devices local to content providers 106, within content server 112, or in data storage devices 110.

In some implementations, the third-party content items are advertisements. The advertisements may be display advertisements such as image advertisements, animated advertisements, moving picture advertisements, audio advertisements, video advertisements, text-based advertisements, or any combination thereof. In other implementations, the third-party content items may include other types of content which serve various non-advertising purposes.

In some implementations, content providers 106 submit campaign parameters to content server 112. The campaign parameters may be used to control the distribution of third-party content items to client devices 108. The campaign parameters may include keywords associated with the third-party content items, bids corresponding to the keywords, a content distribution budget, geographic limiters, or other criteria used by content server 112 to determine when a third-party content item may be presented to client devices 108.

Content providers 106 may access content server 112 to monitor the performance of the third-party content items distributed according to the established campaign parameters. In some implementations, content providers 106 may access content server 112 to review one or more behavior metrics associated with a third-party content item or set of third-party content items. The behavior metrics may describe the interactions between client devices 108 with respect to a distributed third-party content item or set of third-party content items (e.g., number of impressions, number of clicks, a click location, a number of conversions, an amount spent, etc.). The behavior metrics may be based on user actions logged and processed by an accounting system or a log file processing system.

Still referring to FIG. 1, computing system 100 is shown to include client devices 108. Client devices 108 may include any number and/or type of user-operable electronic devices. Client devices 108 may include desktop computers, laptop computers, smartphones, tablets, mobile communication devices, remote workstations, client terminals, entertainment consoles, or any other devices capable of interacting with the other components of computing system 100 (e.g., via a communications interface). Client devices 108 may be capable of receiving resource content from resources 104 and/or third-party content items from content providers 106 or content server 112. Client devices 108 may include mobile devices or non-mobile devices.

In some implementations, client devices 108 include an application (e.g., a web browser, a resource renderer, etc.) for converting electronic content into a user-comprehensible format (e.g., visual, aural, graphical, etc.). Client devices 108 may include a user interface element (e.g., an electronic display, a speaker, a keyboard, a mouse, a microphone, a printer, etc.) for presenting content to a user, receiving user input, or facilitating user interaction with electronic content (e.g., clicking on a content item, hovering over a content item, etc.). Client devices 108 may function as a user agent for allowing a user to view HTML encoded content.

Client devices 108 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a content slot within which a content item is presented. Client devices 108 may be configured to load one or more embedded tags or objects in conjunction with resource content from resources 104. An embedded tag or object may include computer-readable instructions which cause client devices 108 to request a third-party content item from content server 112 when the instructions are executed by client devices 108.

Client devices 108 may be configured to receive and execute a behavioral data collection object. In various implementations, client devices 108 may receive the behavioral data collection object from resources 104 (e.g., as part of the original resource content) or from content server 112. Content server 112 may deliver the behavioral data collection object to client devices 108 along with a content item. The behavioral data collection object may include computer-readable instructions (e.g., a code snippet) for collecting and/or reporting a location at which a user action occurs (e.g., a click, a mouse hover, etc.) within the display area of a content item.

Client devices 108 may run (e.g., process, execute, perform instructions provided by, etc.) the behavioral data collection object to perform various operations in accordance with the instructions included therein. The behavioral data collection object may cause client devices 108 to monitor user actions performed at client devices 108 to determine whether a user action has occurred within the display area of a content item. In response to such a determination, the behavioral data collection object may cause client devices 108 to identify and/or report the location of the content item (e.g., x and y coordinates) at which the user action has occurred.

In some implementations, client devices 108 are capable of detecting an interaction with a distributed content item. An interaction with a content item may include displaying the content item, hovering over the content item, clicking on the content item, viewing source information for the content item, or any other type of interaction between client devices 108 and a content item. Interaction with a content item does not require explicit action by a user with respect to a particular content item. In some implementations, an impression (e.g., displaying or presenting the content item) may qualify as an interaction. The criteria for defining which user actions (e.g., active or passive) qualify as an interaction may be determined on an individual basis (e.g., for each content item), by content providers 106, or by content server 112.

Client devices 108 may generate a variety of user actions. In some implementations, client devices 108 may generate a user action in response to a detected interaction with a content item. The user action may include a plurality of attributes including a content identifier (e.g., a content ID or signature element), a device identifier, a referring URL identifier, a timestamp, a location identifier (e.g., indicating a particular location within a content item), an action type identifier, or any other attributes describing the action. Client devices 108 may generate user actions when particular actions are performed (e.g., viewing a resource, making an online purchase, submitting a search query, clicking on a link or a content item, hovering over a content item, etc.). The user actions generated by client devices 108 may be communicated to content server 112 or a separate accounting system.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated (e.g., by content server 112) in one or more ways before it is stored or used, so that personally identifiable information is removed. A user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by client devices 108, etc.) and used by content server 112.

Still referring to FIG. 1, computing system 100 is shown to include data storage devices 110. Data storage devices 110 may be any type of memory device capable of storing profile data, content item data, accounting data, or any other type of data used by content server 112 or another component of computing system 100. Data storage devices 110 may include any type of non-volatile memory, media, or memory devices. Data storage devices 110 may include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks.

In some implementations, data storage devices 110 are local to content server 112, resources 104, client devices 108, or content providers 106. In other implementations, data storage devices 110 are remote data storage devices connected with content server 112 and/or other components of computing system 100 via network 102. In some implementations, data storage devices 110 are part of a data storage server or system capable of receiving and responding to queries from content server 112 and/or client devices 108.

In some implementations, data storage devices 110 are configured to store event data (e.g., event logs) for various content items. Event data may include behavioral data describing various user actions or interactions with respect to a content item. An event may include an event type attribute (e.g., a click event, a hover event, a conversion event, an impression event, etc.), a time attribute (e.g., a time at which the event occurs), a content item attribute (e.g., a content ID), a device attribute, a referring URL attribute, a location attribute (e.g., indicating a particular location within a content item at which the event occurs), or any other attribute describing the event.

In some implementations, data storage devices 110 are configured to store layout schemes for content items. A layout scheme for a content item may define the areas of the content item occupied by each of a plurality of components of the layout scheme. A layout scheme may indicate that a particular image (e.g., defined by a URL or other image identifier), text string, or other component of the layout scheme occupies a particular area of the content item. The area of a content item occupied by a layout component may be defined by coordinates (e.g., a top left coordinate and a bottom right coordinate of a rectangular area) or any other indicator of a specific portion of the content item.

In some implementations, data storage devices 110 are configured to store weight data for various components of a layout scheme. Weight data may be generated by content server 112 based on the behavioral data for a content item. In some implementations, each component of a layout scheme has a weight associated therewith. The weight for a component of a layout scheme may be stored as an attribute of the associated component. Content server 112 may retrieve the weight data from data storage devices 110 and use the weight data to optimize the layout of the layout scheme to which the weight data applies.

Still referring to FIG. 1, computing system 100 is shown to include a content server 112. In some implementations, content server 112 is a third-party content server. Content server 112 may receive a notification of an available impression from resources 104 and/or client devices 108. The notification of an available impression may be received in response to first-party content from resources 104 being viewed and/or loaded by client devices 108. In some implementations, when client devices load resource content from resources 104, client devices 108 may also load one or more embedded tags (e.g., code snippets) that cause client devices 108 to send a notification of an available impression to content server 112. The notification of an available impression may include a request for third-party content. Content server 112 may be configured to identify a particular resource with which the third-party content item will be displayed (e.g., by URL, by domain name, etc.). Content server 112 may select a third-party content item and deliver the selected third-party content item to client devices 108.

In some implementations, content server 112 generates behavioral data collection object. The behavioral data collection object may include computer-readable instructions collecting and/or reporting behavioral data (e.g., click locations, mouse hover locations, etc.) relating to the selected third-party content item. Content server 112 may deliver the behavioral data collection object to client devices 108 along with a selected third-party content item. The behavioral data collection object may be executed by client devices 108. The behavioral data collection object may cause client devices 108 to monitor user actions performed at client devices 108, to determine whether a user action has occurred within the display area of the third-party content item, to identify a location within the display area of the third-party content item at which a user action has occurred, and/or to report the location of the user action and type of action to content server 112. Content server 112 is described in greater detail with reference to FIG. 2.

Figure 2:
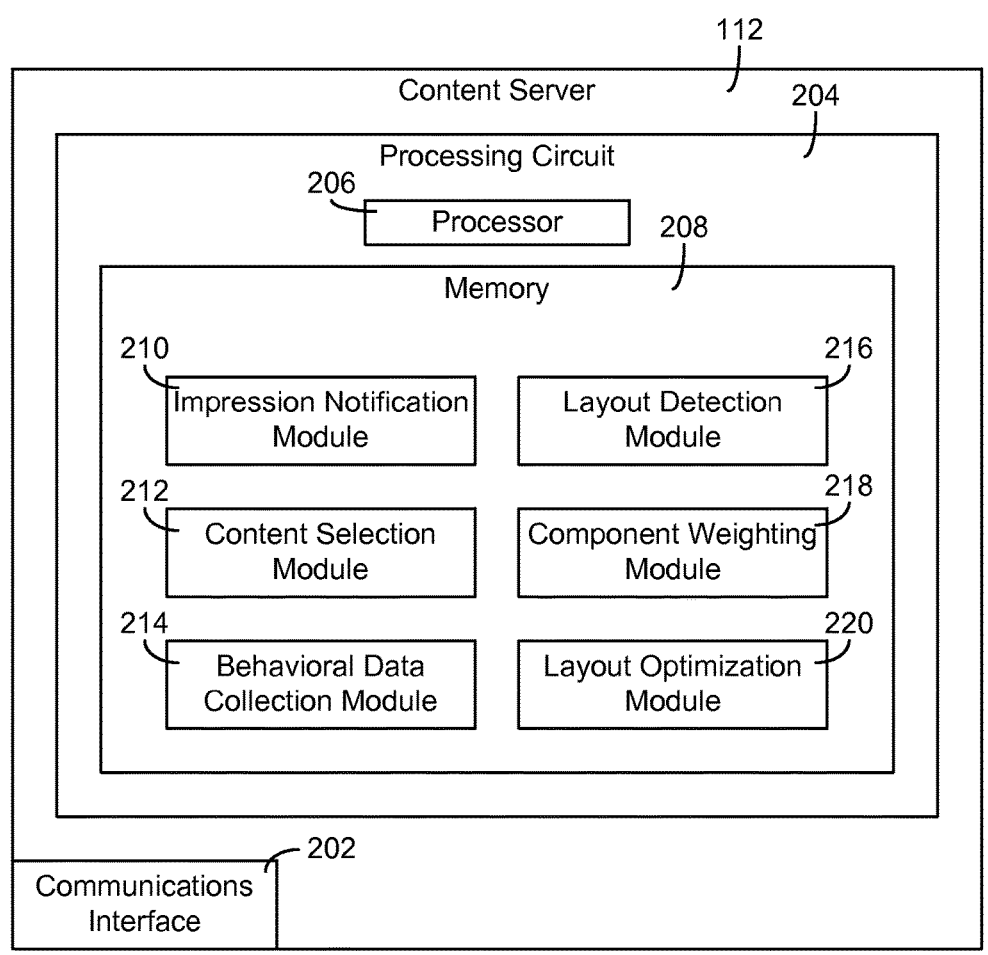
FIG. 2 is a block diagram illustrating the content server of FIG. 1 in greater detail, according to a described implementation.

Referring now to FIG. 2, a block diagram illustrating content server 112 in greater detail is shown, according to a described implementation. Content server 112 is shown to include a communications interface 202 and a processing circuit 204. Communications interface 202 may include wired or wireless interfaces (e.g., jacks, antennas, transmitters, receivers, transceivers, wire terminals, Ethernet ports, WiFi transceivers, etc.) for conducting data communications with local or remote devices or systems. Communications interface 202 may allow content server 112 to communicate with resources 104, content providers 106, client devices 108, network 102, and/or data storage devices 110.

Processing circuit 204 is shown to include a processor 206 and memory 208. Processor 206 may be implemented as a general purpose processor, an application specific integrated circuit (ASIC), one or more field programmable gate arrays (FPGAs), a CPU, a GPU, a group of processing components, or other suitable electronic processing components.

Memory 208 may include one or more devices (e.g., RAM, ROM, flash memory, hard disk storage, etc.) for storing data and/or computer code for completing and/or facilitating the various processes, layers, and modules described in the present disclosure. Memory 208 may include volatile memory or non-volatile memory. Memory 208 may include database components, object code components, script components, or any other type of information structure for supporting the various activities and information structures described in the present disclosure. In some implementations, memory 208 is communicably connected to processor 206 via processing circuit 204 and includes computer code (e.g., data modules stored in memory 208) for executing one or more processes described herein. Memory 208 is shown to include an impression notification module 210, a content selection module 212, a behavioral data collection module 214, a layout detection module 216, a component weighting module 218, and a layout optimization module 220.

Still referring to FIG. 2, memory 208 is shown to include an impression notification module 210. Impression notification module 210 may be configured to receive a notification of an available impression from a first-party resource (e.g., resources 104) and/or from client devices 108. First-party resources may include one or more content slots for presenting third-party content items. The content slots may cause first-party resources to request a third-party content item when loaded by client devices 108.

In some implementations, impression notification module 210 receives a notification of an available impression from client devices 108. When client devices 108 load a first-party resource, an embedded content slot in the first-party resource (e.g., an embedded tag, a "show_ads" tag, etc.) may cause client devices 108 to request a third-party content item from content server 112. Client devices 108 may notify impression notification module 210 of an available impression by requesting a third-party content item from content server 112. The notification of the available impression may include an indication of the first-party resource with which the third-party content item will be presented. The notification of the available impression may include a webpage URL, a document URL, a domain name, or other indication of a particular first-party resource.

Still referring to FIG. 2, memory 208 is shown to include a content selection module 212. Content selection module 212 may be configured to select a third-party content item in response to the request for content received from client devices 108. In some implementations, content selection module 212 identifies a particular resource with which the third-party content item will be displayed (e.g., by URL, by domain name, etc.). Content selection module 212 may select a third-party content item for presentation in association with the identified resource. The third-party content item may be a non-interstitial content item (e.g., a content item presented in a slot of a webpage, alongside resource content) or an interstitial content item.

In some implementations, content selection module 212 selects a third-party content item that is relevant to the first-party resource content in conjunction with which the third-party content item will be presented (e.g., based on the content of the first resource). Content selection module 212 may select a third-party content item by comparing the keywords associated with the content item (e.g., specified by content providers 106, additional keywords extracted from the content item, etc.) with the keywords associated with the first resource. A topic or type of content included in resources 104 may be used to establish keywords for resources 104.

In some implementations, content selection module 212 selects a third-party content item by considering whether the content item is relevant to the client device 108 to which the content item will be presented. Content selection module 212 may compare the keywords associated with the content item with information (e.g., profile data, user preferences, etc.) associated with a particular client device 108 requesting the content item.

In some implementations, content selection module 212 exposes the available impression to content providers 106. Content selection module 212 may auction the available impression to content providers 106. In some implementations, content selection module 212 selects an eligible third-party content item based on a result of the auction. Content selection module 212 may select an eligible content item associated with the content provider that submits the highest bid.

Content selection module 212 may generate a quality signal for the available impression. The quality signal may be based on one or more indications of an estimated return on investment associated with the impression (e.g., an established click-through-rate, a predicted click-through-rate, etc.). The quality signal may be a general quality signal for the identified resource, a particular quality signal for the available impression, or an individualized quality signal for the available impression and a particular third-party content item. Content selection module 212 may provide the quality signal to content providers 106 to consider when bidding on the available impression.

In some implementations, content selection module 212 selects a third-party content item which has characteristics matching the characteristics of a content slot in which the content item will be presented. Content selection module 212 may select a content item having a display size which fits in a destination content slot. Content selection module 212 may resize a selected content item to fit a content slot or add additional visual content to the selected content item (e.g., padding, a border, etc.) based on the display size of the content item and the display size of the content slot. In some implementations, eligible content items include content items matching established user preferences for receiving individualized content; however, content selection module 212 may select a content item that does not match established user preferences if an insufficient number of preferred content items are available. Content selection module 212 may deliver the selected third-party content item to client devices 108 for presentation in association with the first resource.

Still referring to FIG. 2, memory 208 is shown to include a behavioral data collection module 214. Behavioral data collection module 214 may be configured to collect behavioral data for a content item presented on client devices 108. The content item may be a third-party content item or a non-third-party content item. In some implementations, behavioral data collection module 214 generates a behavioral data collection object. The behavioral data collection object may include computer-readable instructions (e.g., a code snippet) for collecting and/or reporting a location at which a user action occurs (e.g., a click, a mouse hover, etc.) within the display area of a content item.

Behavioral data collection module 214 may deliver the behavioral data collection object to client devices 108 along with a content item selected by content selection module 212. In some implementations, behavioral data collection module 214 embeds the behavioral data collection object (e.g., a snippet of computer-readable code) in the content item delivered to client devices 108.

Client devices 108 may run (e.g., process, execute, perform instructions provided by, etc.) the behavioral data collection object to perform various operations in accordance with the instructions included therein. The behavioral data collection object may cause client devices 108 to monitor user actions performed at client devices 108 to determine whether a user action has occurred within the display area of a content item. User actions may include clicking on the content item, hovering over the content item (e.g., with a mouse cursor), selecting the content item, or otherwise interacting with the content item. The behavioral data collection object may cause client devices 108 to identify a location of the content item (e.g., x and y coordinates) at which the user action has occurred and to report the identified location to behavioral data collection module 214.

Behavioral data collection module 214 may be configured to collect (e.g., receive, process, log, etc.) the behavioral data obtained by the behavioral data collection object. In some implementations, behavioral data collection module 214 receives click location data from the behavioral data collection object. Click location data may include one or more click events that occur within the display area of a content item. Each click event may include an event type attribute classifying the event as a click event, a timestamp identifying a time at which the click event occurs, and/or a location attribute indicating a location within the display area of the content item at which the click event occurs.

In some implementations, behavioral data collection module 214 receives hover location data from the behavioral data collection object. Hover location data may include one or more hover events that occur within the display area of a content item. Each hover event may include an event type attribute classifying the event as a hover event, a time attribute identifying a duration of the hover event (e.g., a time that the mouse cursor remains in the same location within the display area of the content item), and/or a location attribute indicating a location within the display area of the content item at which the hover event occurs. Behavioral data collection module 214 may store the click event data and/or the hover event data in a database (e.g., data storage devices 110) for subsequent use in assigning a weight to various components of a layout scheme for the content item.

Still referring to FIG. 2, memory 208 is shown to include a layout detection module 216. Layout detection module 216 may be configured to provide an initial layout scheme for a content item. A layout scheme for a content item may include a display position, a display size, a transparency, and/or other display attributes for various components of the content item (e.g., images, logos, text snippets, etc.). A layout scheme for a content item may define the areas of the content item occupied by each of a plurality of components of the layout scheme. A layout scheme may indicate that a particular image (e.g., defined by a URL or other image identifier), text string, or other component of the layout scheme occupies a particular area of the content item. The area of a content item occupied by a layout component may be defined by coordinates (e.g., a top left coordinate and a bottom right coordinate of a rectangular area), shapes, or any other indicator of a specific portion of the content item.

In some implementations, layout detection module 216 loads an existing layout scheme associated with the content item. Layout schemes may be generated by content providers 106 or by an automated content generation system. Layout detection module 216 may identify a layout scheme associated with a particular content item (e.g., by content item ID) and retrieve the layout scheme from a database.

In other implementations, layout detection module 216 detects a layout scheme by analyzing the visual content of a content item. Layout detection module 216 may use optical character recognition (OCR) to determine the size and location of any text in the content item. Layout detection module 216 may detect images in the content item (e.g., product images, logo images, prominent images, etc.) by comparing the visual content of the content item with a database of existing images. If a match is found between the content item and an image in the image database, layout detection module 216 may identify the location of the image in the content item. In some implementations, layout detection module 216 performs any of a variety of image analysis processes (e.g., foreground image detection, background image detection, edge analysis, pixel color analysis, etc.) to identify and/or locate images in the content item. Layout detection module 216 may generate an initial layout scheme for the content item based on a result of the layout detection.

Still referring to FIG. 2, memory 208 is shown to include a component weighting module 218. Component weighting module 218 may be configured to assign a weight to various components of a layout scheme for a content item based on the behavioral data collected for the content item. Component weighting module 218 may receive or load an initial layout scheme for a content item from layout detection module 216. In some implementations, component weighting module 218 uses the layout scheme to divide the display area of the content item into a plurality of smaller areas or zones. Each zone of the content item may correspond to a particular component of the layout scheme (i.e., the component which occupies the corresponding zone).

Component weighting module 218 may receive behavioral data (e.g., click event data and/or hover event data) for the content item from behavioral data collection module 214. In some implementations, component weighting module 218 associates each user action represented in the behavioral data with a component of the layout scheme. Component weighting module 218 may associate a user action with a component of the layout scheme if the user action occurs within the zone of the content item corresponding to the component. In some implementations, component weighting module 218 identifies a zone of the content item that includes the location defined by the location attribute of a user action event (e.g., x and y coordinates). Component weighting module 218 may associate the user action event with the component of the layout scheme that corresponds to the identified zone.

In some implementations, component weighting module 218 assigns a weight to a component of the layout scheme based on the number of click events associated with the component. Each click event that occurs within a particular zone of the content item may increment (e.g., increase, add to, etc.) the weight of the corresponding component of the layout scheme. Component weighting module 218 may calculate the weight of a layout scheme component attributable to click events (i.e., a click event weight "$W_c$") by multiplying the total number of click events associated with the component ("$N_c$") by a click weight multiplier ("$k_c$") (e.g., $W_c=N_c*k_c$). In various implementations, other click event weight formulas may be used to calculate the click event weight for each component as a function of the behavioral data.

In some implementations, component weighting module 218 assigns a weight to a component of the layout scheme based on the number of hover events associated with the component. Each hover event that occurs within a particular zone of the content item may increment the weight of the corresponding component of the layout scheme. Component weighting module 218 may calculate the weight of a layout scheme component attributable to hover events (i.e., a hover event weight "$W_h$") by multiplying the total duration of hover events associated with the component ("$T_h$") by a hover weight multiplier ("$k_h$") (e.g., $W_h=T_h*k_h$). The total duration of hover events associated with a component may be the total amount of time that a mouse cursor hovers over the component of the content item. In various implementations, other hover event weight formulas may be used to calculate the hover event weight for each component as a function of the behavioral data.

Component weighting module 218 may calculate the combined weight ("W") for a component of the layout scheme by summing the click event weight and the hover event weight (e.g., $W=W_c+W_h$). In various implementations, the click event weight and/or the hover event weight may be multiplied by weighting factors or otherwise adjusted when calculating the combined weight for the component. In some implementations, other formulas may be used to calculate the combined weight for each component as a function of the behavioral data.

Component weighting module 218 may assign the calculated weights to the corresponding components of the layout scheme for the content item (e.g., as attributes of each component). In some implementations, component weighting module 218 stores and/or outputs the assigned weights. The weights assigned to each component of the layout scheme may be used (e.g., by layout optimization module 220) to optimize the layout of the content item.

Still referring to FIG. 2, memory 208 is shown to include a layout optimization module 220. Layout optimization module 220 may access the layout scheme for a content item and identify the weight assigned to each component of the layout scheme. Layout optimization module 220 may be configured to optimize the layout of a content item based on the weights assigned to each component of the layout scheme. Optimizing the layout of the content item may include adjusting a display size of a component of the layout scheme such that a display size ratio between a relatively greater-weighted component of the layout scheme and a relatively lesser-weighted component of the layout scheme is increased. In other words, layout optimization module 220 may increase the display size of relatively greater-weighted components relative to the display size of relatively lesser-weighted components.

In some implementations, layout optimization module 220 initially decreases the display size of each component of the layout scheme. Layout optimization module 220 may decrease the display size of each component of the layout scheme to a minimum display size for the component. In some implementations, the minimum display size for a component is defined as the minimum size of the component for the component to be clearly legible. The minimum display size for an image component of the layout scheme may be a minimum threshold display area. The minimum threshold display area may be a fixed display size (e.g., a minimum number of horizontal pixels, a minimum number of vertical pixels, a minimum display area, etc.) or a function of the original display size of the image component (e.g., 75% of the original display size, 50% of the original display size, etc.). The original display aspect ratio of an image component may be maintained. The minimum display size for a text component may be a minimum threshold font size. Layout optimization module 220 may decrease the display size of each component of the layout scheme to the minimum display size to make room for components having a high assigned weight.

Layout optimization module 220 may optimize the layout of the content item by highlighting or emphasizing one or more highly-weighted components of the layout scheme. In some implementations, layout optimization module 220 highlights and/or emphasizes a predetermined number of components of the layout scheme with the greatest assigned weights (e.g., the two greatest-weighted components). Layout optimization module 220 may identify the component of the layout scheme with the greatest assigned weight (i.e., the "first component") and the component of the layout scheme with the second-greatest assigned weight (i.e., the "second component"). In some implementations, layout optimization module 220 calculates a weight ratio between the weight assigned to the first component ("$W_1$") and a weight assigned to the second component ("$W_2$") (e.g., $$W_{ratio} = \frac{W_1}{W_2}).$$

Layout optimization module 220 may increase the display size of the first component to a maximum permissible display size. The maximum permissible display size of the first component may be limited by various layout constraints such as a minimum margin (e.g., spacing) between the first component and other components of the layout scheme, a minimum margin or padding between the first component and the perimeter of the content item, and/or a maximum size threshold for the first component. For image components, the maximum size threshold may be a fixed display size or a function of the original display size of the image component. For text components, the maximum size threshold may be a maximum font size (e.g., 32 pt. font). In some implementations, increasing the display size of the first component includes increasing the display size incrementally (e.g., by one pixel at a time) until the display size cannot be increased any further without violating a layout constraint.

The maximum size threshold for an image may prevent the image from being stretched larger than the display size of a raw image source for the image in the content item (e.g., a stored image used to create the content item). The raw image source may have a display size larger than the image component of the original content item. The image component of the original content item may be a scaled (e.g., reduced-size) version of the raw image source. An image component of the content item can be expanded to a size greater than the original size of the image component in the content item without exceeding the maximum size threshold.

Layout optimization module 220 may identify the display size ("$S_1$") of the first component of the layout scheme after the display size of the first component has been increased to the maximum permissible display size. Layout optimization module 220 may use the display size $S_1$ of the first component and the weights assigned to each component to calculate a target display size ("$S_2$") for the second component of the layout scheme. In some implementations, layout optimization module 220 calculates the target display size $S_2$ for the second component of the layout scheme such that the ratio between $S_1$ and $S_2$ matches the ratio between $W_1$ and $W_2$ (e.g., $$\frac{S_1}{S_2} = \frac{W_1}{W_2}).$$

Layout optimization module 220 may increase the display size of the second component to the target display size $S_2$. In some implementations, increasing the display size of the second component includes increasing the display size incrementally (e.g., by one pixel at a time) until the display size reaches the target display size $S_2$ or until the display size cannot be increased any further without violating a layout constraint. Layout constraints for the second component may include a minimum margin (e.g., spacing) between the second component and other components of the layout scheme, a minimum margin or padding between the second component and the perimeter of the content item, and/or a maximum size threshold for the second component. For image components, the maximum size threshold may be a fixed display size or a function of the original display size of the image component. For text components, the maximum size threshold may be a maximum font size (e.g., 32 pt. font).

In various implementations, layout optimization module 220 increases the display sizes of one or more additional components of the content item (e.g., a third greatest-weighted component, a fourth greatest-weighted component, etc.). Layout optimization module 220 may determine whether any usable space remains in the content item after increasing the display sizes of the first component, the second component, and any additional components which have been increased in size. If any useable space remains, layout optimization module 220 may increase the display sizes of any components that have not yet been increased in size in order to fill the usable space (e.g., increasing the display sizes of each remaining component evenly until the usable space is filled).

In some implementations, layout optimization module 220 determines whether each component of the layout scheme is an image component or a text component. For text components, layout optimization module 220 may highlight or emphasize the text by bolding, underlining, italicizing, or using other special font attributes for the text component. Layout optimization module 220 may use such techniques for highlighting or emphasizing text in addition to or in place of adjusting the display size for selected components of the layout scheme.

Referring now to FIGS. 3-8, several drawings of a content item 302 are shown, according to a described implementation. FIGS. 3-8 illustrate content item 302 at various stages of an optimization process. The optimization process may be performed by layout optimization module 220 to transform content item 302 from the layout scheme shown in FIG. 3 to the layout scheme shown in FIG. 8.

Figure 3:
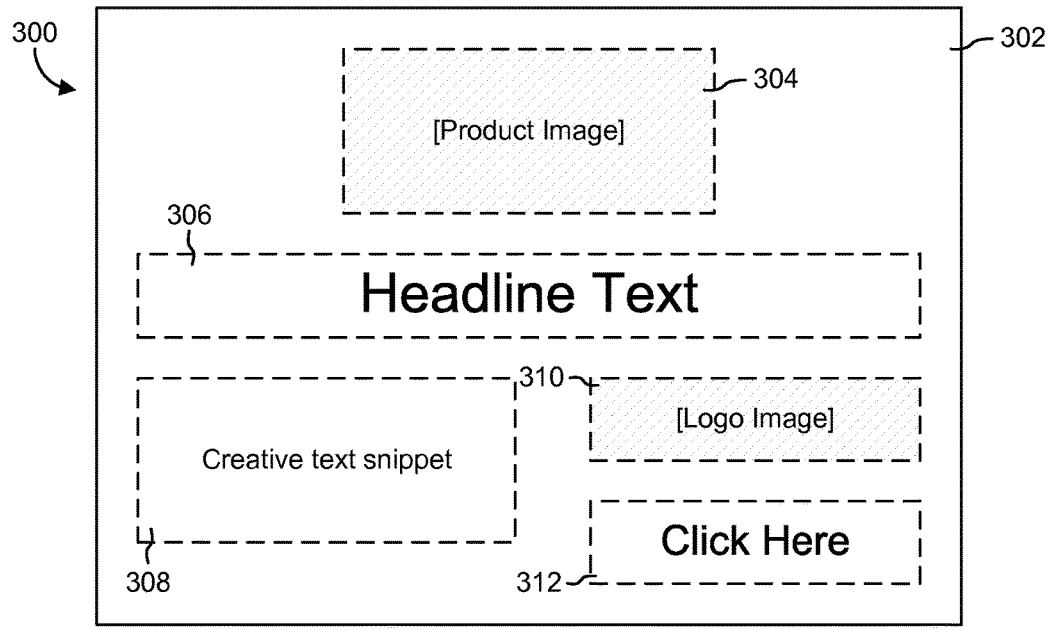
FIG. 3 is a drawing of a content item having an initial layout scheme which includes a product image component, a logo image component, a headline text component, a descriptive text component, and an action button component, according to a described implementation.

Referring specifically to FIG. 3, an initial layout scheme 300 for content item 302 is shown, according to a described implementation. Layout scheme 300 is shown to include several components including a product image component 304, a headline text component 306, a creative text component 308, a logo image component 310, and an action button component 312. Layout scheme 300 may be defined by the positions, display sizes, and other attributes of components 304-312 (e.g., font attributes, transparency attributes, etc.).

Layout scheme 300 may indicate an area of content item 302 associated with each of components 304-312. The area of content item 302 associated with a particular component of layout scheme 300 may be the area of content item 302 that is occupied by the associated component. The area of content item 302 that is associated with product image component 304 may be the area bounded by the perimeter of product image component 304. Content item 302 may be arranged according to layout scheme 300 when content item 302 is initially delivered to client devices 108.

Figure 4:
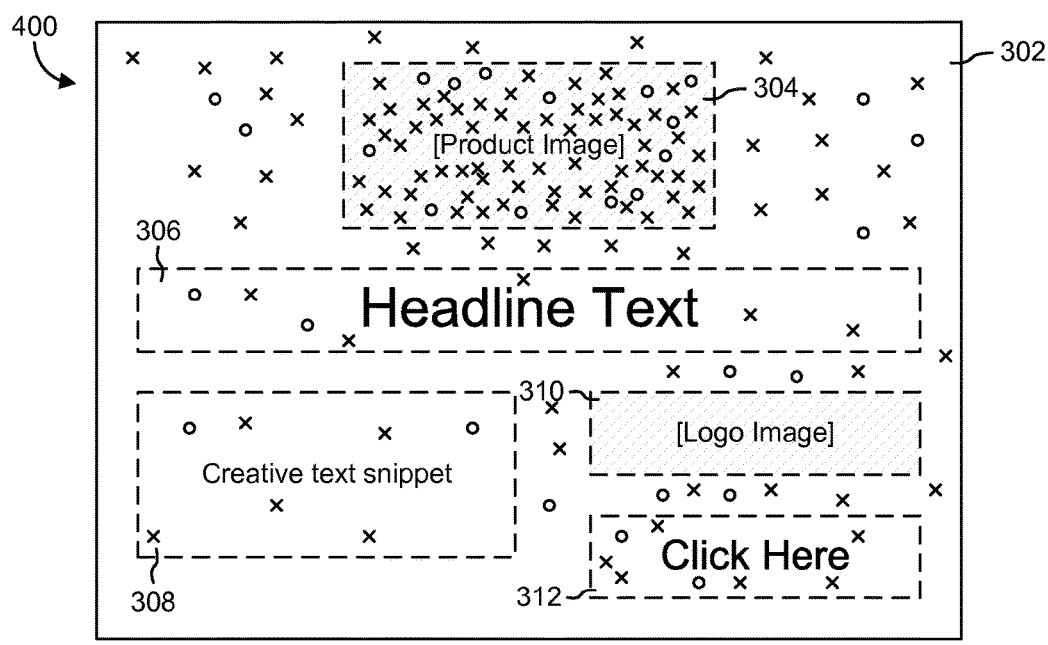
FIG. 4 is a drawing of a user action map illustrating locations within the display area of the content item of FIG. 3 at which user actions (e.g., click events and hover events) occur, each of the user actions incrementing a weight associated with a corresponding component of the content item, according to a described implementation.

Referring now to FIG. 4, a user action map 400 for content item 302 is shown, according to a described implementation. Users of client devices 108 may perform a variety of user actions with respect to content item 302. Users can click on content item 302, hover over content item 302, inspect content item 302, or otherwise act or interact with respect to content item 302. Client devices 108 may run a behavioral data collection object which reports the locations (e.g., x and y coordinates) at which user actions occur within the display area of content item 302.

User action map 400 illustrates a collection of locations within the display area of content item 302 at which click events and hover events occur (e.g., as reported by behavioral data collection objects running on client devices 108). Each click event is represented by an "X" and each hover event is represented by an "O" in user action map 400. User action map 400 may be illustrative of behavioral data collected from many different client devices 108. Although only a small subset (e.g., approximately one hundred) of click events and hover events are shown in user action map 400, any number and/or type of user action events (e.g., click events, hover events, inspection events, impression events, etc.) can be logged for content item 302. The number and type of user action events recorded may depend upon a frequency with which content item 302 is delivered to client devices 108 and/or a frequency with which users interact with content item 302.

In the collection of behavioral data shown in FIG. 4, the greatest number of user action events occur within an area of content item 302 associated with product image component 304. The second greatest number of user action events occur within an area of content item 302 associated with logo image component 310. The remaining user action events occur at other locations within the display area of content item 302 (e.g., within an area associated with headline text component 306, creative text component 308, action button component 312, or elsewhere within the display area of content item 302). Component weighting module 218 may use the number of user action events that occur within each area of content item 302 to assign a weight to the corresponding component of layout scheme 300. For the behavioral data represented in user action map 400, component weighting module 218 may assign the greatest weight to product image component 304 and the second greatest weight to logo image component 310.

Figure 5:
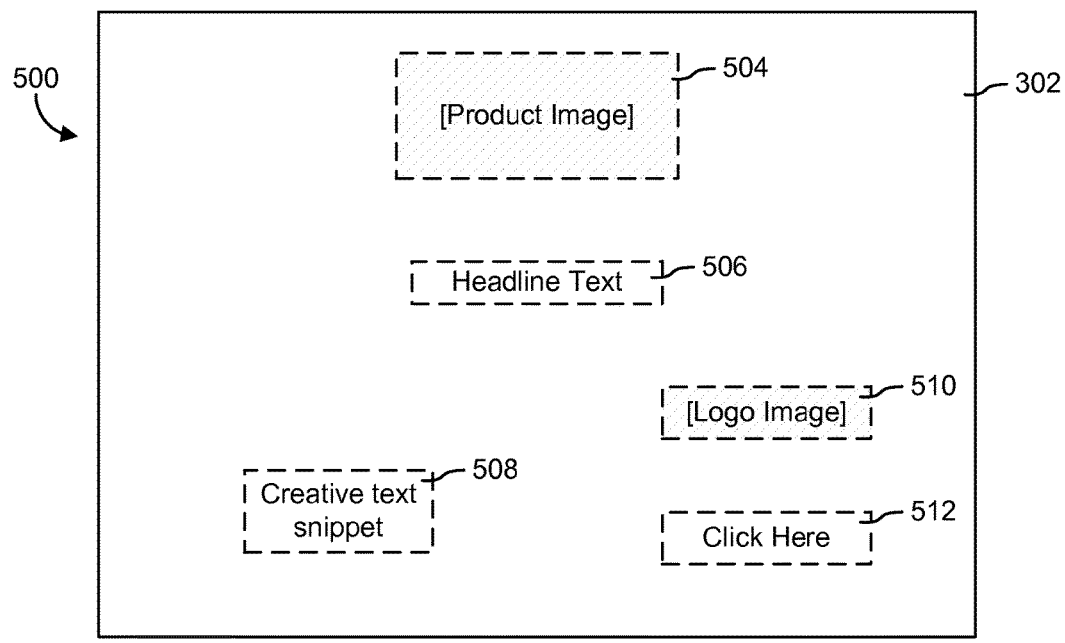
FIG. 5 is a drawing of the content item of FIG. 3 with the components of the layout scheme minimized, according to a described implementation.

Referring now to FIG. 5, content item 302 is shown with components arranged according to a minimum size layout scheme 500. Layout optimization module 220 may reduce each of the components of layout scheme 300 to a minimum size to generate layout scheme 500. Each of the components of layout scheme 500 is a reduced-size version of a corresponding component in layout scheme 300. Product image component 504 is a smaller version of product image component 304; headline text component 506 is a smaller version of headline text component 306; creative text component 508 is a smaller version of creative text component 308, logo image component 510 is a smaller version of logo image component 310; and action button component 512 is a smaller version of action button component 312. Layout optimization module 220 may decrease the display size of each component of layout scheme 300 to the minimum display size so that space is available for increasing the display size of components having a high assigned weight.

In some implementations, the minimum display size for a component is defined as the minimum size of the component for the component to be clearly legible. The minimum display size for an image component of the layout scheme may be a minimum threshold display area. The minimum threshold display area may be a fixed display size (e.g., a minimum number of horizontal pixels, a minimum number of vertical pixels, a minimum display area, etc.) or a function of the original display size of the image component (e.g., 75% of the original display size, 50% of the original display size, etc.). The original display aspect ratio of an image component may be maintained. The minimum display size for a text component may be a minimum threshold font size.

Figure 6:
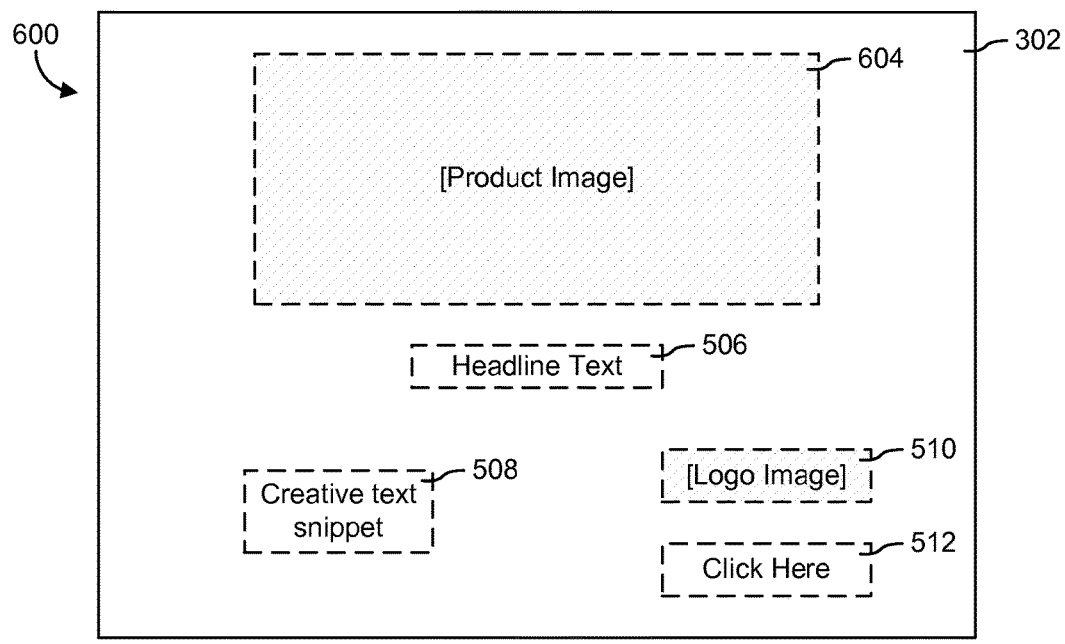
FIG. 6 is a drawing of the content item of FIG. 3 with the greatest-weighted component of the layout scheme (e.g., the product image component) increased in display size to a maximum permissible display size, according to a described implementation.

Referring now to FIG. 6, content item 302 is shown with components arranged according to an intermediary layout scheme 600. Intermediary layout scheme 600 may result from layout optimization module 220 increasing the display size of the component having the greatest assigned weight (i.e., product image component 504) to a maximum permissible display size. In layout scheme 600, product image component 604 is a maximum-size version of product image component 504.

The maximum permissible display size of product image component 604 may be limited by various layout constraints such as a minimum margin (e.g., spacing) between component 604 and other components of the layout scheme, a minimum margin or padding between component 604 and the perimeter of content item 302, and/or a maximum size threshold for product image component 604. For image components, the maximum size threshold may be a fixed display size or a function of the original display size of the image component. For text components, the maximum size threshold may be a maximum font size (e.g., 32 pt. font). Other components of layout scheme 500 may be moved to ensure that layout constraints are satisfied.

Figure 7:
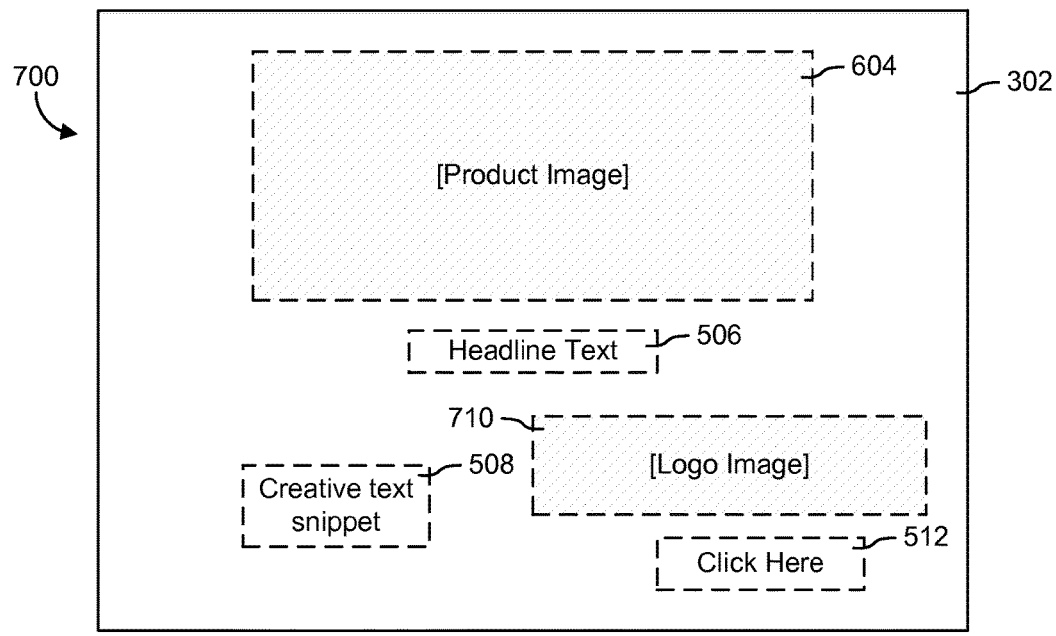
FIG. 7 is a drawing of the content item of FIG. 3 with the second greatest-weighted component of the layout scheme (e.g., the logo image component) increased in display size such that the size ration between the greatest-weighted component and the second greatest-weighted component matches the weight ratio between such components, according to a described implementation.

Referring now to FIG. 7, content item 302 is shown with components arranged according to another intermediary layout scheme 700. Intermediary layout scheme 700 may result from layout optimization module 220 increasing the display size of the component having the second greatest assigned weight (i.e., logo image component 510) to a target display size. In layout scheme 700, logo image component 710 is a target version of logo image component 510.

In some implementations, the target size for the component having the second greatest assigned weight (i.e., component 710) is a function of the display size of the component having the greatest assigned weight (i.e., component 604). Layout optimization module 220 may identify the display size $S_1$ of the component having the greatest assigned weight after the display size of the first component has been increased to the maximum permissible display size. In some implementations, layout optimization module 220 calculates the target display size $S_2$ for the component of the layout scheme having the second greatest assigned weight (i.e., component 710) such that the ratio between $S_1$ and $S_2$ matches the ratio between $W_1$ and $W_2$ (e.g., $$\frac{S_1}{S_2} = \frac{W_1}{W_2}).$$

$W_1$ and $W_2$ may be the weights assigned to product image component 604 and logo image component 710, respectively.

Layout optimization module 220 may increase the display size of logo image component 510 until the display size reaches the target display size $S_2$ for logo image component 710. In some implementations, increasing the display size of the component having the second greatest assigned weight includes increasing the display size incrementally (e.g., by one pixel at a time) until the display size reaches the target display size $S_2$ or until the display size cannot be increased any further without violating a layout constraint. Layout constraints for component 710 may include a minimum margin (e.g., spacing) between component 710 and other components of the layout scheme, a minimum margin or padding between component 710 and the perimeter of content item 302, and/or a maximum size threshold for component 710. For image components, the maximum size threshold may be a fixed display size or a function of the original display size of the image component. For text components, the maximum size threshold may be a maximum font size (e.g., 32 pt. font).

Figure 8:
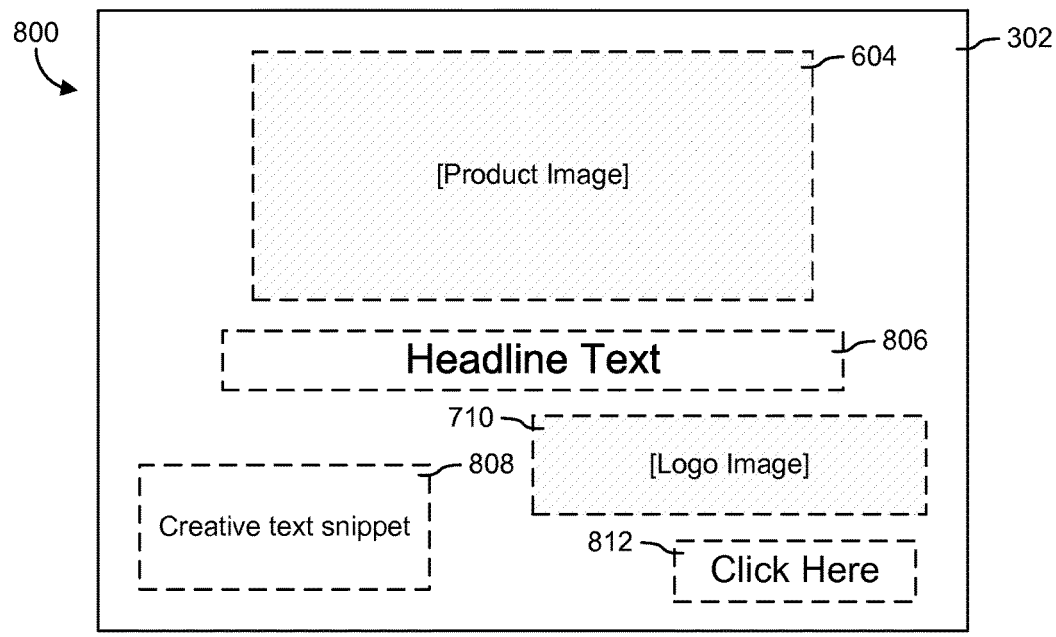
FIG. 8 is a drawing of the content item of FIG. 3 having an optimized layout scheme in which the display sizes of the remaining components are increased to fill any usable space after the display sizes of the greatest-weighted component and the second greatest-weighted component are increased, according to a described implementation.

Referring now to FIG. 8, content item 302 is shown with components arranged according to an optimized layout scheme 800. Layout scheme 800 may be generated by increasing the display sizes of one or more components of layout scheme 700 that have not yet been increased in size (e.g., headline text component 506, creative text component 508, action button 512, etc.). Layout optimization module 220 may determine whether any usable space remains in content item 302 after increasing the display sizes of product image component 604 and logo image component 710. If any useable space remains, layout optimization module 220 may increase the display sizes of any components that have not yet been increased in size.

Each of components 806, 808, and 812 may be an increased-size version of a corresponding component in layout scheme 700. Headline text component 806 is a larger version of headline text component 506; creative text component 808 is a larger version of creative text component 508; and action button component 812 is a larger version of action button component 512. Layout optimization module 220 may increase the display size of each component of layout scheme 700 that has not yet been increased in size in order to fill the usable space. In some implementations, the display sizes of components 806, 808, and 812 may be increased evenly or uniformly until the usable space is filled.

Figure 9:
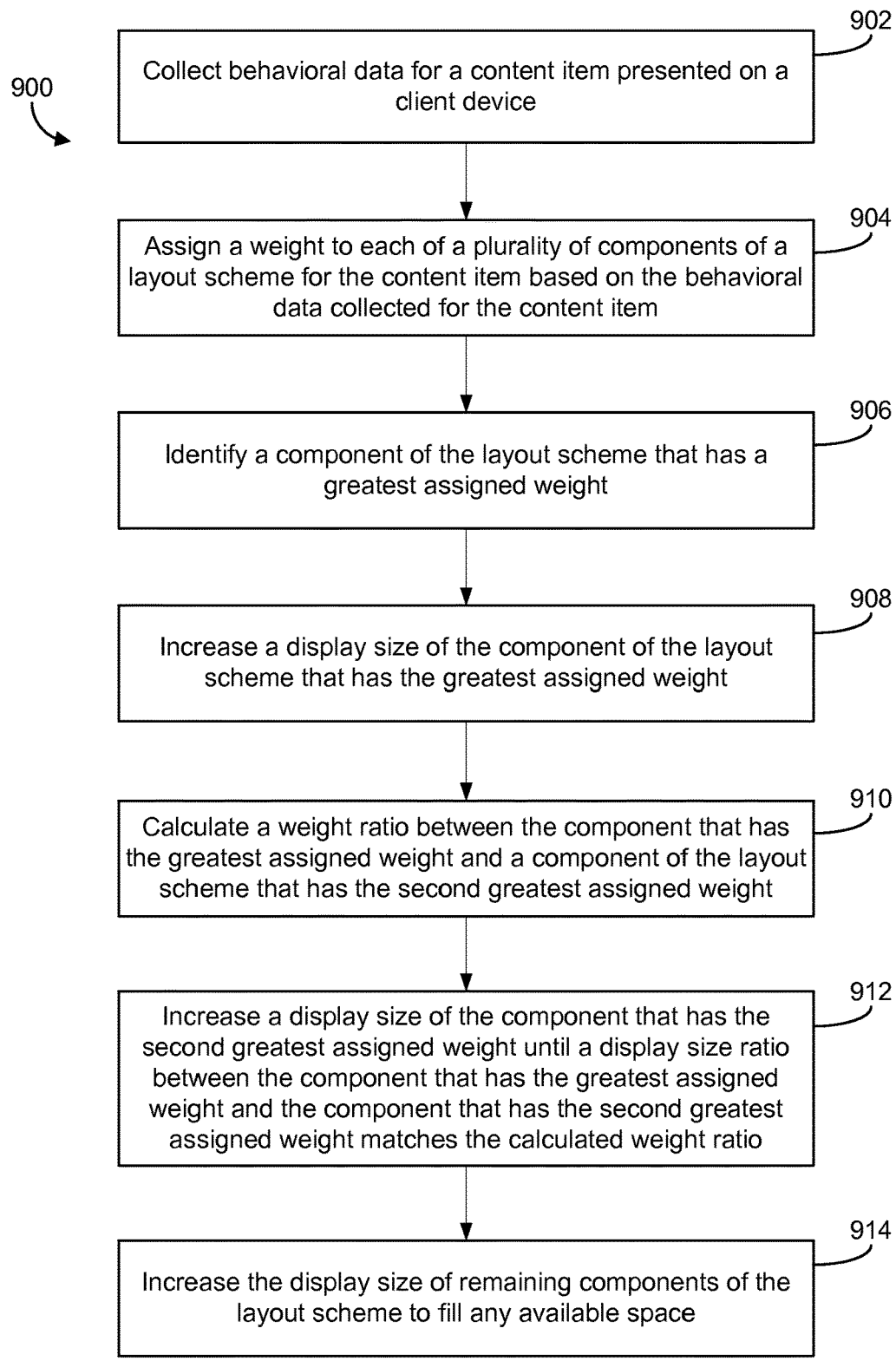
FIG. 9 is a flowchart of a process for optimizing content layout using behavior metrics, according to a described implementation.

Referring now to FIG. 9, a flowchart of a process 900 for optimizing the layout of a content item is shown, according to a described implementation. In some implementations, process 900 is performed by content server 112 (e.g., using one or more of memory modules 210-220) as described with reference to FIG. 2.

Process 900 is shown to include collecting behavioral data for a content item presented on a client device (step 902). The content item may be a third-party content item or a non-third party content item. In some implementations, step 902 includes generating a behavioral data collection object. The behavioral data collection object may include computer-readable instructions (e.g., a code snippet) for collecting and/or reporting a location at which a user action occurs (e.g., a click, a mouse hover, etc.) within the display area of a content item. The behavioral data collection object may be delivered to the client device (e.g., client devices 108) along with a content item. In some implementations, the behavioral data collection object includes computer-readable instructions embedded in the content item delivered to the client device.

The client device may run (e.g., process, execute, perform instructions provided by, etc.) the behavioral data collection object to perform various operations in accordance with the instructions included therein. The behavioral data collection object may cause the client device to monitor user actions performed at the client device for user actions that occur within the display area of the content item. User actions may include clicking on the content item, hovering over the content item (e.g., with a mouse cursor), selecting the content item, or otherwise interacting with the content item. The behavioral data collection object may cause the client device to identify a location of the content item (e.g., x and y coordinates) at which the user action occurs and to report the identified location to content server 112.

Step 902 may include collecting (e.g., receiving, processing, logging, etc.) the behavioral data obtained by the behavioral data collection object. In some implementations, step 902 includes receiving click location data from the behavioral data collection object. Click location data may include one or more click events that occur within the display area of a content item. Each click event may include an event type attribute classifying the event as a click event, a timestamp identifying a time at which the click event occurs, and/or a location attribute indicating a location within the display area of the content item at which the click event occurs.

In some implementations, step 902 includes receiving hover location data from the behavioral data collection object. Hover location data may include one or more hover events that occur within the display area of a content item. Each hover event may include an event type attribute classifying the event as a hover event, a time attribute identifying a duration of the hover event (e.g., a time that the mouse cursor remains in the same location within the display area of the content item), and/or a location attribute indicating a location within the display area of the content item at which the hover event occurs. Step 902 may include storing the click event data and/or the hover event data in a database (e.g., data storage devices 110).

Still referring to FIG. 9, process 900 is shown to include assigning a weight to a plurality of components of a layout scheme for the content item based on the behavioral data collected for the content item (step 904). Step 904 may include receiving or loading an initial layout scheme for the content item. The layout scheme may be used to divide the display area of the content item into a plurality of smaller areas or zones. Each zone of the content item may correspond to a particular component of the layout scheme (i.e., the component which occupies the corresponding zone).

Step 904 may include associating each user action represented in the behavioral data with a component of the layout scheme. A user action may be associated with a component of the layout scheme if the user action occurs within the zone of the content item corresponding to the component. In some implementations, step 904 includes identifying a zone of the content item that includes the location defined by the location attribute of a user action event (e.g., x and y coordinates). Step 904 may include associating the user action event with the component of the layout scheme that corresponds to the identified zone.

In some implementations, step 904 includes assigning a weight to a component of the layout scheme based on the number of click events associated with the component. Each click event that occurs within a particular zone of the content item may increment (e.g., increase, add to, etc.) the weight of the corresponding component of the layout scheme. Step 904 may include calculating the weight of a layout scheme component attributable to click events (i.e., a click event weight "$W_c$") by multiplying the total number of click events associated with the component ("$N_c$") by a click weight multiplier ("$k_c$") (e.g., $W_c=N_c*k_c$). In various implementations, other click event weight formulas may be used to calculate the click event weight for each component as a function of the behavioral data.

In some implementations, step 904 includes assigning a weight to a component of the layout scheme based on the number of hover events associated with the component. Each hover event that occurs within a particular zone of the content item may increment the weight of the corresponding component of the layout scheme. Step 904 may include calculating the weight of a layout scheme component attributable to hover events (i.e., a hover event weight "$W_h$") by multiplying the total duration of hover events associated with the component ("$T_h$") by a hover weight multiplier ("$k_h$") (e.g., $W_h=T_h*k_h$). The total duration of hover events associated with a component may be the total amount of time that a mouse cursor hovers over the component of the content item. In various implementations, other hover event weight formulas may be used to calculate the hover event weight for each component as a function of the behavioral data.

Step 904 may include calculating the combined weight ("W") for a component of the layout scheme by summing the click event weight and the hover event weight (e.g., $W=W_c+W_h$). In various implementations, the click event weight and/or the hover event weight may be multiplied by weighting factors or otherwise adjusted when calculating the combined weight for the component. In some implementations, other formulas may be used to calculate the combined weight for each component as a function of the behavioral data.

Step 904 may include assigning the calculated weights to the corresponding components of the layout scheme for the content item (e.g., as attributes of each component). In some implementations, step 904 includes storing and/or outputting the assigned weights. The weights assigned to each component of the layout scheme may be used (e.g., by layout optimization module 220) to optimize the layout of the content item.

Still referring to FIG. 9, process 900 is shown to include identifying a component of the layout scheme that has the greatest assigned weight (step 906) and increasing the display size of the component of the layout scheme that has the greatest assigned weight (step 908). In some implementations, step 908 includes increasing the display size of the of the component that has the greatest assigned weight relative to a display size of a component that has a lesser assigned weight (e.g., increasing the display size of the component that has the greatest assigned weight and/or decreasing the display size of the component that has the lesser assigned weight).

In some implementations, step 908 includes initially decreasing the display size of each component of the layout scheme. The display size of each component of the layout scheme may be decreased to a minimum display size for the component. In some implementations, the minimum display size for a component is defined as the minimum size of the component for the component to be clearly legible. The minimum display size for an image component of the layout scheme may be a minimum threshold display area. The minimum threshold display area may be a fixed display size (e.g., a minimum number of horizontal pixels, a minimum number of vertical pixels, a minimum display area, etc.) or a function of the original display size of the image component (e.g., 75% of the original display size, 50% of the original display size, etc.). The original display aspect ratio of an image component may be maintained. The minimum display size for a text component may be a minimum threshold font size. The display size of each component of the layout scheme may be decreased to the minimum display size to make room for components having a high assigned weight.

In some implementations, step 908 includes increasing the display size of the component having the greatest assigned weight to a maximum permissible display size. The maximum permissible display size of the first component may be limited by various layout constraints such as a minimum margin (e.g., spacing) between the first component and other components of the layout scheme, a minimum margin or padding between the first component and the perimeter of the content item, and/or a maximum size threshold for the first component. For image components, the maximum size threshold may be a fixed display size or a function of the original display size of the image component. For text components, the maximum size threshold may be a maximum font size (e.g., 32 pt. font). In some implementations, increasing the display size of the first component includes increasing the display size incrementally (e.g., by one pixel at a time) until the display size cannot be increased any further without violating a layout constraint.

The maximum size threshold for an image may prevent the image from being stretched larger than the display size of a raw image source for the image in the content item (e.g., a stored image used to create the content item). The raw image source may have a display size larger than the image component of the original content item. The image component of the original content item may be a scaled (e.g., reduced-size) version of the raw image source. An image component of the content item can be expanded to a size greater than the original size of the image component in the content item without exceeding the maximum size threshold.

Still referring to FIG. 9, process 900 is shown to include calculating a weight ratio between the component that has the greatest assigned weight and a component of the layout scheme that has the second greatest assigned weight (step 910). Step 910 may include accessing the weights assigned in step 904 to identify the greatest weight ("$W_1$") and the second greatest weight ("$W_2$"). Calculating the weight ratio may include dividing the greatest weight by the second greatest weight (e.g., $$W_{ratio} = \frac{W_1}{W_2}).$$

Still referring to FIG. 9, process 900 is shown to include increasing a display size of the component that has the second greatest assigned weight until a display size ratio between the component that has the greatest assigned weight and the component that has the second greatest assigned weight matches the calculated weight ratio (step 912). Step 912 may include identifying the display size ("$S_1$") of the component having the greatest assigned weight after the display size of the component having the greatest assigned weight has been increased to the maximum permissible display size. In some implementations, step 912 includes calculating a target display size ("$S_2$") for the component of the layout scheme having the second greatest assigned weight. The target display size may be calculated such that the ratio between $S_1$ and $S_2$ matches the ratio between $W_1$ and $W_2$ (e.g., $$\frac{S_1}{S_2} = \frac{W_1}{W_2}).$$

Still referring to FIG. 9, process 900 is shown to include increasing the display size of remaining components of the layout scheme to fill any available space (step 914). Step 914 may include increasing the display sizes of one or more components of the layout scheme that have not yet been increased in size (e.g., components other than the components having the greatest two assigned weights). Step 914 may include determining whether any usable space remains in the content item after increasing the display sizes of the most heavily weighted components. If any useable space remains, step 914 may include increasing the display sizes of any components that have not yet been increased in size. In some implementations, step 914 includes increasing the display sizes evenly or uniformly until the usable space is filled.

What is claimed is:

1. A method for optimizing a layout of content presented on a client device, the method comprising:
   identifying, by a processing system, using a layout scheme of a content item, a plurality of display zones of a display area of the content item, each display zone defined by a corresponding component of a plurality of components of the layout scheme of the content item and the content item for display in a content slot of an information resource;
   providing, by the processing system to a plurality of client devices, the content item and a script for executing on the plurality of client devices to cause the plurality of client devices to monitor interactions with the content item;
   receiving, by the processing system, interaction data for the content item generated by the script executing on each of the plurality of client devices, the interaction data indicating for each client device of the plurality of client devices corresponding display coordinates within the display area of the content item at which a user action occurs on the client device;
   mapping, by the processing system, the display coordinates for at least one client device of the plurality of client devices to a first display zone of the plurality of display zones associated with a first component of the layout scheme for the content item;
   assigning, by the processing system, a first weight to the first component and a second weight different from the first weight to a second component of the layout scheme for the content item based on the interaction data received for the content item and the mapping of the display coordinates for the at least one client device of the plurality of client devices to the first display zone associated with the first component, the first and second weights are non-zero weights; and
   modifying, by the processing system, a display size of the first component of the layout scheme that has the first assigned weight relative to a display size of the second component of the layout scheme that has the second assigned weight different from the first assigned weight.

2. The method of claim 1, further comprising:
   calculating, by the processing system, a weight ratio between the first component that has the first assigned weight and the second component that has the second assigned weight; and
   modifying, by the processing system, a display size of the second component that has the second assigned weight until a display size ratio between the first component that has the first assigned weight and the second component that has the second assigned weight matches the calculated weight ratio.

3. The method of claim 1, further comprising:
   prior to modifying the display size of the first component that has the first assigned weight, modifying, by the processing system, a display size of each of the plurality of components of the layout scheme to a minimum display size; and
   after modifying the display size of the first component that has the first assigned weight, uniformly modifying, by the processing system, the display size of each of the plurality of components of the layout scheme that have not yet been modified in display size until any usable space in the content item is filled.

4. The method of claim 1, wherein the user action within the display area of the content item comprises at least one of:
   clicking on the content item at the location; or
   hovering over the content item at the location.

5. The method of claim 1, wherein the interaction data for the content item comprises an indication of separate coordinates for each of a plurality of user actions that occur within the display area of the content item on a client device of the plurality of client devices.

6. The method of claim 1, wherein assigning a weight to a component of the layout scheme comprises:
   using, by the processing system, an initial layout scheme for the content item to identify for each client device of the plurality of client devices a corresponding component of the initial layout scheme associated with a corresponding display zone of the content item within which the user action occurs on the client device of the plurality of client devices; and
   incrementing, by the processing system, for each identified component of the layout scheme a corresponding weight.

7. The method of claim 1, wherein modifying the display size of the first component that has the first assigned weight relative to the display size of the second component that has the second assigned weight comprises at least one of:
   increasing, by the processing system, the display size of the first component that has the first assigned weight; or decreasing, by the processing system, the display size of the second component that has the second assigned weight.

8. The method of claim 1, wherein modifying the display size of the first component that has the first assigned weight relative to the display size of the second component that has the second assigned weight comprises:
   prior to modifying the display size of the second component that has the second assigned weight, decreasing, by the processing system, the display size of each of a plurality of components of the layout scheme to a minimum display size;
   wherein the display size of the component that has the first assigned weight is increased from the minimum display size to a maximum display size.

9. The method of claim 8, further comprising:
   determining, by the processing system, for each of the plurality of components of the layout scheme, whether the component is an image component or a text component;
   wherein the minimum display size for an image component is a threshold display area; and
   wherein the minimum display size for a text component is a minimum threshold font size.

10. The method of claim 8, further comprising:
    determining, by the processing system, whether the first component that has the first weight is an image component or a text component;
    wherein, if the component that has the first assigned weight is an image component, the maximum display size is a display size of a raw image used to generate the image component; and
    wherein, if the first component that has the first assigned weight is a text component, the maximum display size is a maximum threshold font size.

11. A system for optimizing a layout of content presented on a client device, the system comprising:
    a memory storing one or more software modules; and
    at least one processor, the one or more software modules when executed by the at least one processor cause the system to:
      identify, using a layout scheme of a content item, a plurality of display zones of a display area of the content item, each display zone defined by a corresponding component of a plurality of components of the layout scheme of the content item and the content item for display in a content slot of an information resource;
      provide, to a plurality of client devices, the content item and a script for executing on the plurality of client devices to cause the plurality of client devices to monitor interactions with the content item;
      receive interaction data for the content item generated by the script executing on each of the plurality of client devices, the interaction data indicating for each client device of the plurality of client devices corresponding display coordinates within the display area of the content item at which a user action occurs on the client device;
      map the display coordinates for at least one client device of the plurality of client devices to a first display zone of the plurality of display zones associated with a first component of the layout scheme for the content item;
      assign, by the processor, a first weight to the first component and a second weight different from the first weight to a second component of the layout scheme for the content item based on the interaction data received for the content item and the mapping of the display coordinates for the at least one client device of the plurality of client devices to the first display zone associated with the first component, the first and second weights are non-zero weights; and
      modify a display size of the first component of the layout scheme that has the first assigned weight relative to a display size of the second component of the layout scheme that has the second assigned weight different from the first assigned weight.

12. The system of claim 11, wherein the one or more software modules when executed by the at least one processor further cause the system to:
    calculate a weight ratio between the first component that has the first assigned weight and the second component that has the second assigned weight; and
    modify a display size of the second component that has the second assigned weight until a display size ratio between the first component that has the first assigned weight and the second component that has the second assigned weight matches the calculated weight ratio.

13. The system of claim 11, wherein the one or more software modules when executed by the at least one processor cause the system to:
    prior to modifying the display size of the first component that has the first assigned weight, modify a display size of each of the plurality of components of the layout scheme to a minimum display size; and
    after modifying the display size of the first component that has the first assigned weight, uniformly modify the display size of each of the plurality of components of the layout scheme that have not yet been modified in display size until any usable space in the content item is filled.

14. The system of claim 11, wherein the user action within the display area of the content item comprises at least one of:
    clicking on the content item at the location; or
    hovering over the content item at the location.

15. The system of claim 11, wherein the interaction data for the content item comprises an indication of separate coordinates for each of a plurality of user actions that occur within the display area of the content item on a client device of the plurality of client devices.

16. A non-transitory computer-readable storage medium having instructions stored therein, wherein the instructions are executable by one or more processors to cause the one or more processors to perform operations comprising:
    identifying, by the one or more processors, using a layout scheme of a content item, a plurality of display zones of a display area of the content item, each display zone defined by a corresponding component of a plurality of components of the layout scheme of the content item and the content item for display in a content slot of an information resource;
    providing, by the one or more processors to a plurality of client devices, the content item and a script for executing on the plurality of client devices to cause the plurality of client devices to monitor interactions with the content item;
    receiving, by the one or more processors, interaction data for the content item generated by the script executing on each of the plurality of client devices, the interaction data indicating for each client device of the plurality of client devices corresponding display coordinates within the display area of the content item at which a user action occurs on the client device;

mapping, by the one or more processors, the display coordinates for at least one client device of the plurality of client devices to a first display zone of the plurality of display zones associated with a first component of the layout scheme for the content item;

assigning, by the one or more processors, a first weight to the first component and a second weight different from the first weight to a second component of the layout scheme for the content item based on the interaction data received for the content item and the mapping of the display coordinates for the at least one client device of the plurality of client devices to the first display zone associated with the first component, the first and second weights are non-zero weights; and modifying, by the one or more processors, a display size of the first component of the layout scheme that has the first assigned weight relative to a display size of the second component of the layout scheme that has the second assigned weight different from the first assigned weight.

17. The non-transitory computer-readable storage medium of claim 16, the operations further comprising:

calculating, by the one or more processors, a weight ratio between the first component that has the first assigned weight and the second component that has the second assigned weight and modifying, by the one or more processors, a display size of the second component that has the second assigned weight until a display size ratio between the first component that has the first assigned weight and the second component that has the second assigned weight matches the calculated weight ratio.

* * * * *